(12) United States Patent
Wu et al.

(10) Patent No.: US 12,149,996 B2
(45) Date of Patent: Nov. 19, 2024

(54) DYNAMIC IDLE MODE SEARCH AND MEASUREMENT SCHEDULING BASED ON REFERENCE SIGNAL MEASUREMENT

(71) Applicant: QUALCOMM Incorporated, San Diego, CA (US)

(72) Inventors: Yongle Wu, San Diego, CA (US); Alexei Yurievitch Gorokhov, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/648,083

(22) Filed: Jan. 14, 2022

(65) Prior Publication Data
US 2023/0232263 A1    Jul. 20, 2023

(51) Int. Cl.
  *H04B 17/20*       (2015.01)
  *H04B 17/318*      (2015.01)
  (Continued)

(52) U.S. Cl.
  CPC ...... *H04W 36/0088* (2013.01); *H04B 17/255* (2023.05); *H04B 17/318* (2015.01);
  (Continued)

(58) Field of Classification Search
  CPC ... H04B 7/02–12; H04B 17/0082–3913; H04J 11/0023–0093; H04J 2011/0003–0096; H04L 1/0001–0039; H04L 5/0001–0098; H04W 24/02–10; H04W 36/0005–385; H04W 48/02–20; H04W 56/001–0025; H04W 72/02–569; H04W 74/002–0891; H04W 84/02–16;
  (Continued)

(56) References Cited

U.S. PATENT DOCUMENTS 10,979,979 B1    4/2021  Kong et al.
2010/0208604 A1  8/2010  Kazmi et al.
(Continued)

FOREIGN PATENT DOCUMENTS

WO    2021027930 A1    2/2021

OTHER PUBLICATIONS

International Search Report and Written Opinion—PCT/US2023/060531—ISA/EPO—Apr. 5, 2023.
(Continued)

*Primary Examiner* — Timothy J Weidner
(74) *Attorney, Agent, or Firm* — Patterson & Sheridan, L.L.P.

(57) ABSTRACT

Certain aspects of the present disclosure provide techniques for cell measurement scheduling mode selection. According to certain aspects, a method for wireless communications by a user equipment (UE), generally includes selecting a first scheduling mode for performing cell measurements while the UE is in an idle state, in response to detecting at least one first triggering condition based on a comparison of a serving cell measurement to one or more neighbor cell measurements and performing cell measurements in accordance with the first scheduling mode, wherein the UE performs cell measurement more frequently when the first scheduling mode is selected than when a second scheduling mode is selected.

26 Claims, 10 Drawing Sheets

(51) Int. Cl.
  *H04W 24/08* (2009.01)
  *H04W 24/10* (2009.01)
  *H04W 36/00* (2009.01)
  *H04W 72/0446* (2023.01)
  *H04W 72/1263* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC .......... *H04W 24/08* (2013.01); *H04W 24/10* (2013.01); *H04W 36/0058* (2018.08); *H04W 36/00837* (2018.08); *H04W 36/0094* (2013.01); *H04W 72/0446* (2013.01); *H04W 72/1263* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ..... H04W 88/02–12; H04W 92/02–04; H04W 92/10
  See application file for complete search history.

(56) References Cited

U.S. PATENT DOCUMENTS

2010/0216455 A1* 8/2010 Kazmi ................ H04W 36/30
2022/0131596 A1* 4/2022 Sharma ................ H04W 24/10
2022/0338124 A1* 10/2022 Sabouri-Sichani ... H04W 24/10

OTHER PUBLICATIONS

Mediatek Inc: "[Offline-513] Summary of Offline Related to Measurement Relaxation Criteria", 3GPP TSG-RAN WG2 Meeting #107, R2-1911620, 3rd Generation Partnership Project (3GPP), Mobile Competence Centre, 650, Route Des Lucioles, F-06, vol. RAN WG2, No. Prague, Czech Republic, Aug. 26, 2019-Aug. 30, 2019, 7 Pages, Aug. 30, 2019, KP051769327.

* cited by examiner

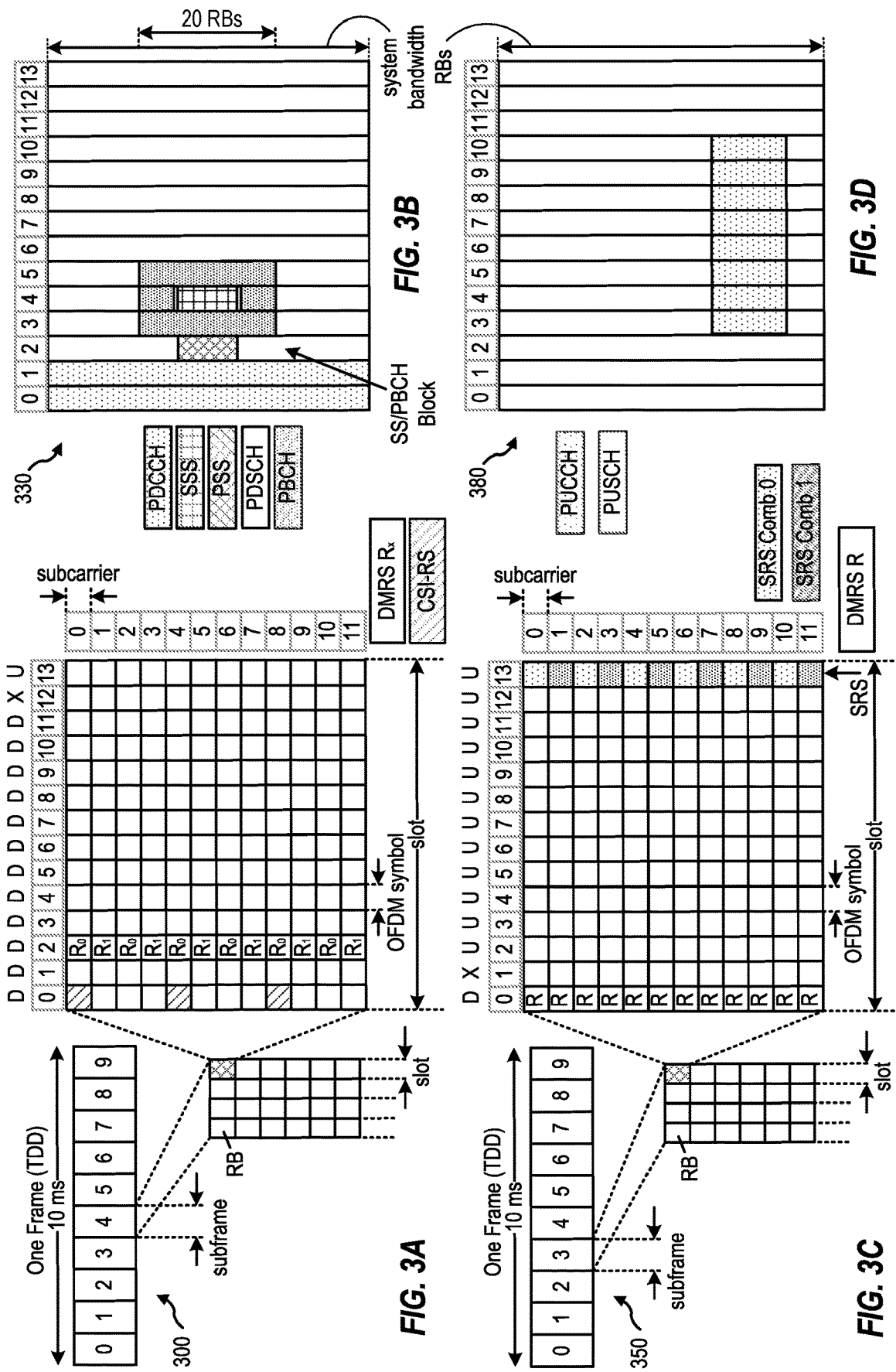

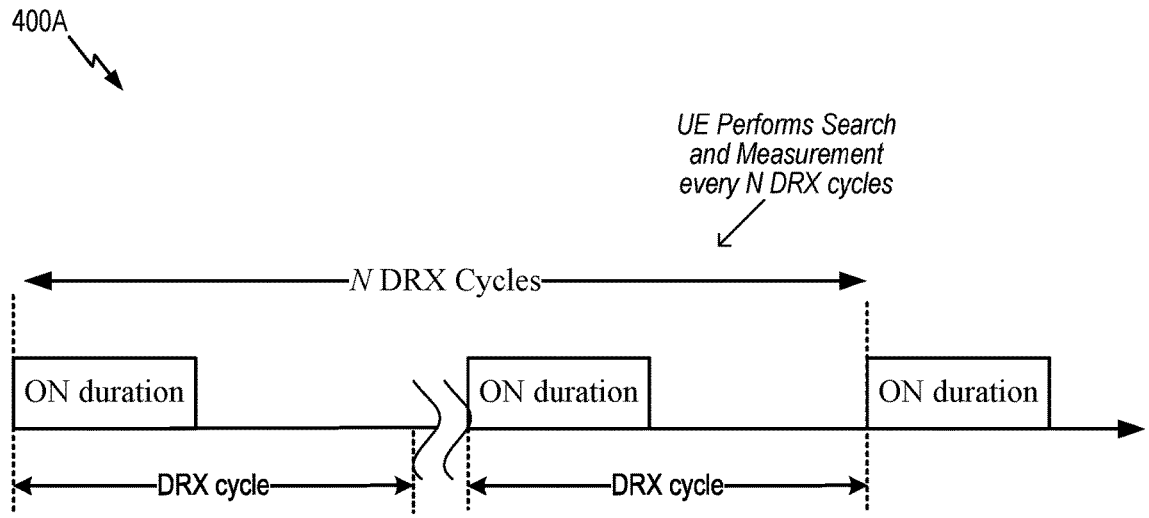

*FIG. 4A*

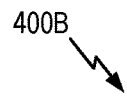

| Mode | Scenarios | Search/Measurement Scheduling |
|---|---|---|
| Panic Mode | Signal quality is poor | Schedule aggressively as power is secondary concern (more frequently/at shorter intervals) |
| Normal Mode | Signal quality is okay | Schedule with reference to spec requirement |
| Excellent Mode | Signal quality is very good | Schedule further sparsely to save power (less frequently/at longer intervals) |

*FIG. 4B*

DYNAMIC IDLE MODE SEARCH AND MEASUREMENT SCHEDULING BASED ON REFERENCE SIGNAL MEASUREMENT

INTRODUCTION

Aspects of the present disclosure relate to wireless communications, and more particularly, to techniques for selecting idle mode measurement scheduling modes based on reference signal measurement.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), including selecting a first scheduling mode for performing cell measurements while the UE is in an idle state, in response to detecting at least one first triggering condition based on a comparison of a serving cell measurement to one or more neighbor cell measurements; and performing cell measurements in accordance with the first scheduling mode, wherein the UE performs cell measurement more frequently when the first scheduling mode is selected than when a second scheduling mode is selected.

One aspect provides a method for wireless communication by a UE, including selecting a first scheduling mode for performing cell measurements while the UE is in an idle state, in response to detecting at least one first triggering condition based on a comparison of a current serving cell measurement to at least one previous serving cell measurement; and performing cell measurements in accordance with the first scheduling mode, wherein the UE performs cell measurement more frequently when the first scheduling mode is selected than when a second scheduling mode is selected.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIG. 4A depicts an example idle mode cell measurement interval according to a scheduling mode.

FIG. 4B depicts a table with features and descriptions of various idle mode cell measurement scheduling modes.

DETAILED DESCRIPTION

Figure 1:
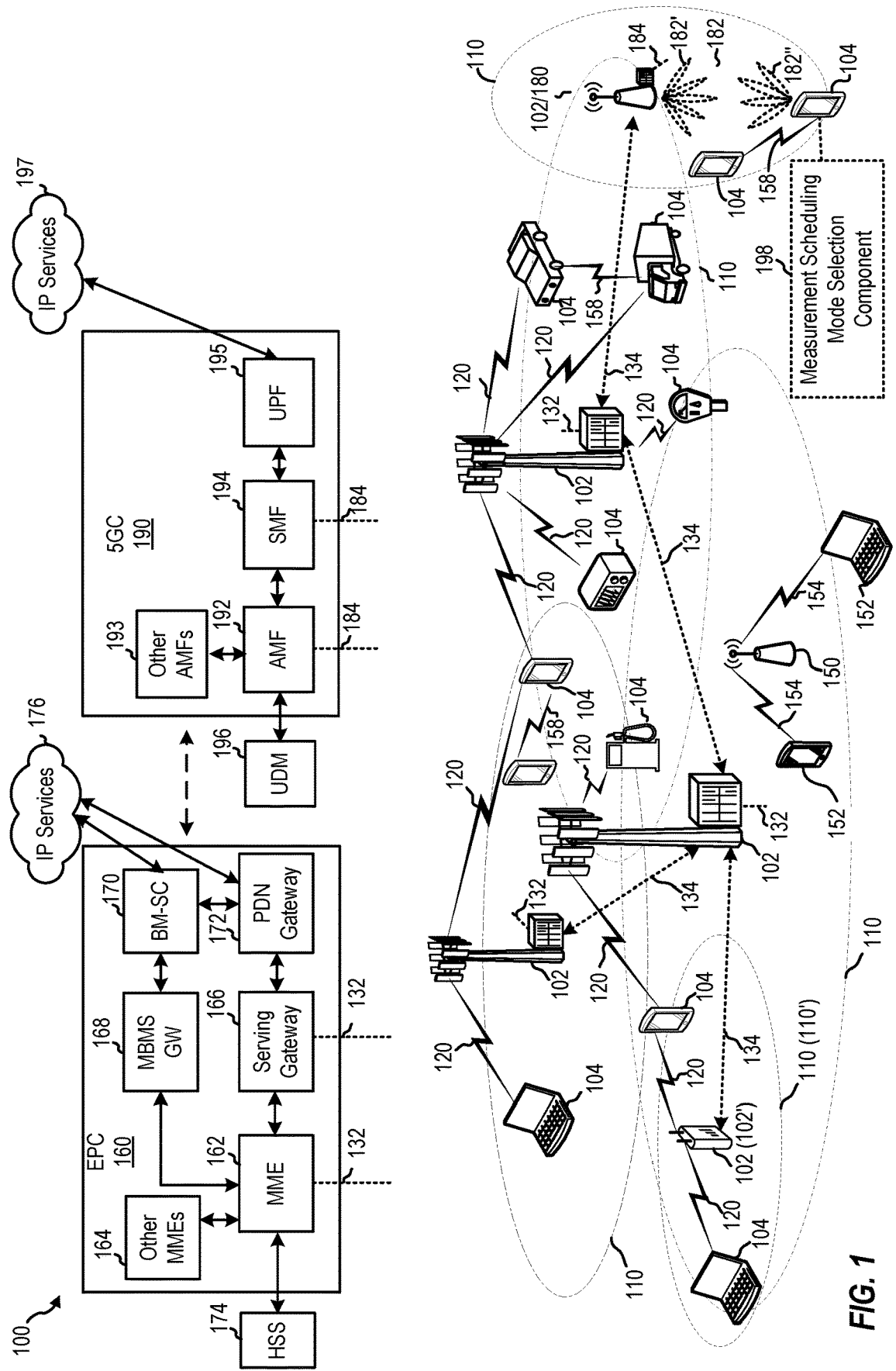
FIG. 1 is a block diagram conceptually illustrating an example wireless communication network.

Aspects of the present disclosure provide apparatuses, methods, processing systems, and computer-readable mediums for selecting idle mode measurement scheduling modes based on certain reference signal measurement related conditions.

Cell search and measurement is a collective term generally referring to the procedure of measurement, evaluation, and detection performed by a user equipment (UE) for various purposes. In this context, measurement generally refers to the process of measuring of measuring reference signal received power (RSRP) and/or reference signal received quality (RSRQ) based on reference signals in serving and neighbor cells. Evaluation generally refers to the process of evaluating certain criteria based on the measurement results in order to select a suitable cell. The criteria typically involve the measured RSRP and RSRQ, minimum required RSRP and RSRQ levels, and various offsets (e.g., in a simplified reselection procedure, a cell with the highest RSRP may be selected). Detection generally refers to the process of tuning to a specific frequency and performing a synchronization process in order to decode sufficient information of a cell to establish communication (e.g., a Physical Cell ID and broadcast system information). These procedures improve UE performance by allowing a UE to move between cells to maintain coverage within a network.

To conserve power, when a UE has no activity for a period of time, it can move into an idle mode. In idle mode, a UE typically UE periodically wakes up, according to a discontinuous reception (DRX) cycle, to monitor for paging messages and goes back to sleep mode if paging message is not intended for it. The UE also performs cell search and measurement at least once per given interval (e.g., based on DRX cycles).

Because more frequent measurements (shorter intervals) leads to increased power consumption, various scheduling modes have been devised in an attempt to select intervals that represent a good tradeoff between power consumption and performance. The scheduling modes are typically determined based on signal quality, as determined by reference signal measurements (e.g., signal to noise ratio) and paging failures. For example, when serving cell signal quality is poor, the UE may enter what is referred to as a panic mode where the UE schedule measurements more frequently, as the urgency of finding a cell with better signal quality may outweigh power consumption. On the other hand, when signal quality is very good (referred to as an excellent mode), the UE may schedule measurements less frequently to enhance power savings.

One potential issue with current scheduling mode determination, is that it is typically based on serving cell factors only, such as serving cell SNR and Paging failures. In other words, search and measurement scheduling is adjusted without considering other factors, such as signal quality in neighbor cells. As a result, a UE may increase measurement frequency even at times when neighbor cell signal quality is not better than a serving cell. This leads to increase power consumption despite the fact that criteria for selecting a neighbor cell are not likely to be met. Selecting scheduling modes based on paging failures may also be less than ideal. This is because paging failures may only be detected even in certain cases (SNR ranges) where a control channel (scheduling the page) is detected, while the actual shared channel carrying the page fails (is not detected). In other cases, when the control channel fails, the UE may not know about the scheduled shared channel and, thus, may not count this as a failed page.

Aspects of the present disclosure may help address these issues, by basing measurement scheduling mode selection on various conditions. For example, the conditions may include reference signal measurements of a neighbor cell being greater than reference signal measurements in a serving cell by a threshold amount. Using this approach, a panic mode may be selected only when it is more likely the increased cell measurement frequency will lead to selection of a neighbor, meaning the increased power consumption may be justified. Thus, the techniques described herein may lead to improvements in idle mode cell reselection time and an increase in overall performance, particularly in high mobility scenarios, such as high speed train (HST) deployments.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communication links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes measurement scheduling mode selection component 198, which may be used by UEs 104 to select scheduling modes for performing cell measurements in response to detecting certain conditions.

Figure 2:
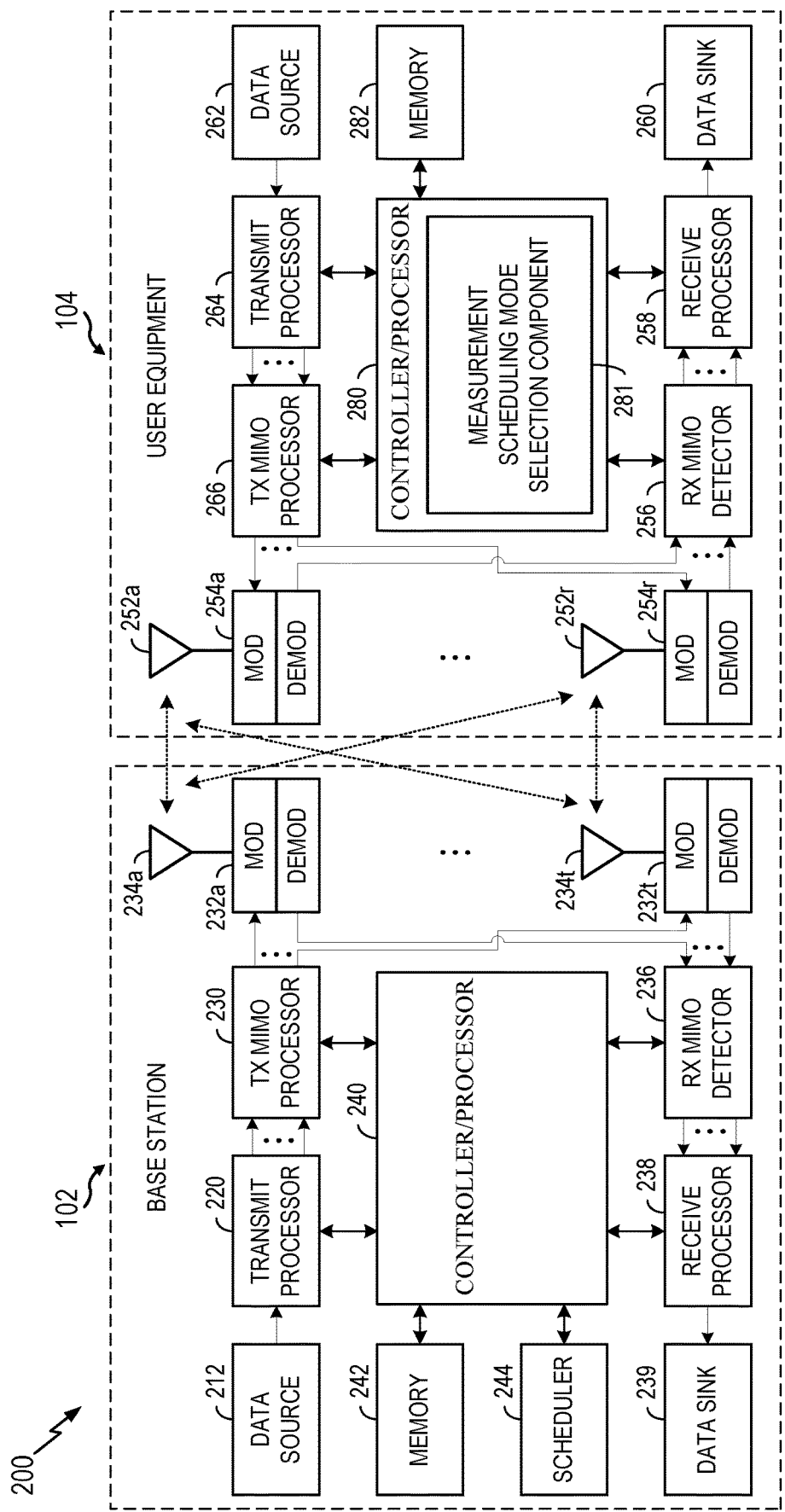
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes measurement scheduling mode selection component 281, which may be representative of measurement scheduling mode selection component 198 of FIG. 1. Notably, while depicted as an aspect of controller/processor 280, measurement scheduling mode selection component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mm Wave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Overview of Idle Mode Discontinuous Reception (DRX)

In NR, Discontinuous Reception (DRX) is one mechanism to reduce UE power consumption and extend battery life. As illustrated in FIG. 4A, in a DRX mode, the UE periodically enters a 'sleep' state (DRX Off duration) during which RF components may be powered down as PDCCH need not be monitored. In order to monitor PDCCH for possible downlink/uplink data, the UE is configured to wake up periodically and stay 'awake' (DRX On duration) for a certain amount of time before going to 'sleep' again. As illustrated, one DRX On duration and one DRX Off duration occurs in a DRX cycle (according to a configured DRX periodicity).

In addition to reducing UE power consumption, DRX is also beneficial from the network standpoint in terms of scheduling flexibility and resource allocation. When a UE is not in DRX mode, a UE performs certain functions that consume resources. While the UE is in DRX mode, the gNB can assign these resources to other UEs to optimize resource utilization.

A base station (e.g., gNB) configures a UE with a set of DRX parameters, typically selected to optimize power consumption while allowing the UE to be reachable without too much delay. In other words, when DRX is enabled, the UE battery power consumption is reduced but at the cost of increase latency. This is because, there might be an extended delay in receiving data as, the UE may be in DRX Sleep state at the time of data arrival at the gNB, meaning the gNodeB would have to wait until the UE becomes active in a subsequent. The latency obviously increases with DRX cycle length, so DRX parameters must be carefully selected such that the packet delay is minimized, and power saving is maximized.

Aspects Related to Dynamic Idle Mode Search and Measurement Scheduling Based on Reference Signal Measurement As noted above, to conserve power, a UE may transition to an idle mode where data is not exchanged. In typical scenarios, a UE transitions from an idle mode to a connected mode frequently (e.g., 100s of times a day). As a result, optimizing power consumption while still achieving a level of performance in terms of reaching a UE acceptable latency is a challenge.

As illustrated in FIG. 4A, in an effort to maintain network coverage, a UE in idle mode periodically performs cell search and measurement at least once in a given interval defined by a number (N) of DRX cycles. As noted above, because more frequent measurements (shorter intervals, smaller N) leads to increased power consumption, various scheduling modes have been devised in an attempt to select intervals that represent a good tradeoff between power consumption and performance.

FIG. 4B illustrates an example of three scheduling modes determined based on signal quality. When signal quality is adequate in a serving cell, the UE may transition to (or stay in) a normal mode, where the UE schedules search and measurement according to an interval specified by a standard. When the signal quality is poor, the UE may transition to a panic mode, where the UE schedules measurements more frequently (shorter intervals, smaller N), as the urgency of finding a cell with better signal quality may outweigh power consumption. When signal quality is very good, the UE may transition to an excellent mode (longer intervals, larger N) schedule measurements less frequently to enhance power savings.

The UE may transition between the various modes based on serving cell signal quality, as determined by various metrics. For example, the UE may measure signal to noise ratio (SNR) or reference signal received quality (RSRQ) based on measurement of reference signal transmitted in the serving cell. The UE may also track certain metrics indicative of signal quality, such as paging failures. The UE may then transition between modes by comparing these measurements/metrics to various thresholds. For example, a UE may enter a panic mode if SNR or RSRQ is less than a threshold (e.g., SNR<−6 dB or RSRQ<−18 dB). The UE may also enter the panic mode if a number of paging failures in a given period exceeds a threshold amount. Paging failures may be detected when a control channel (CCH) scheduling a shared channel (SCH) with a paging message is detected, but the corresponding SCH is not received.

One potential issue with current scheduling mode determination, is that it is typically based on serving cell factors only without considering other factors, such as signal quality in neighbor cells. As a result, a UE may increase measurement frequency even at times when neighbor cell signal quality is not better than a serving cell. This leads to increase power consumption despite the fact that criteria for selecting a neighbor cell are not likely to be met. Selecting scheduling modes based on paging failures may also be less than ideal. This is because paging failures may only be detected even in certain cases (SNR ranges) where a paging CCH is detected, while the actual SCH carrying the page fails. In other cases, when the control channel fails, the UE may not know about the scheduled shared channel and, thus, may not count this as a failed page.

Aspects of the present disclosure may help address these issues, by basing measurement scheduling mode selection on various conditions. For example, the conditions may include reference signal measurements of a neighbor cell being greater than reference signal measurements in a serving cell by a threshold amount. Using this approach, a panic mode may be selected only when it is more likely the increased cell measurement frequency will lead to selection of a neighbor, meaning the increased power consumption may be justified.

Figure 5:
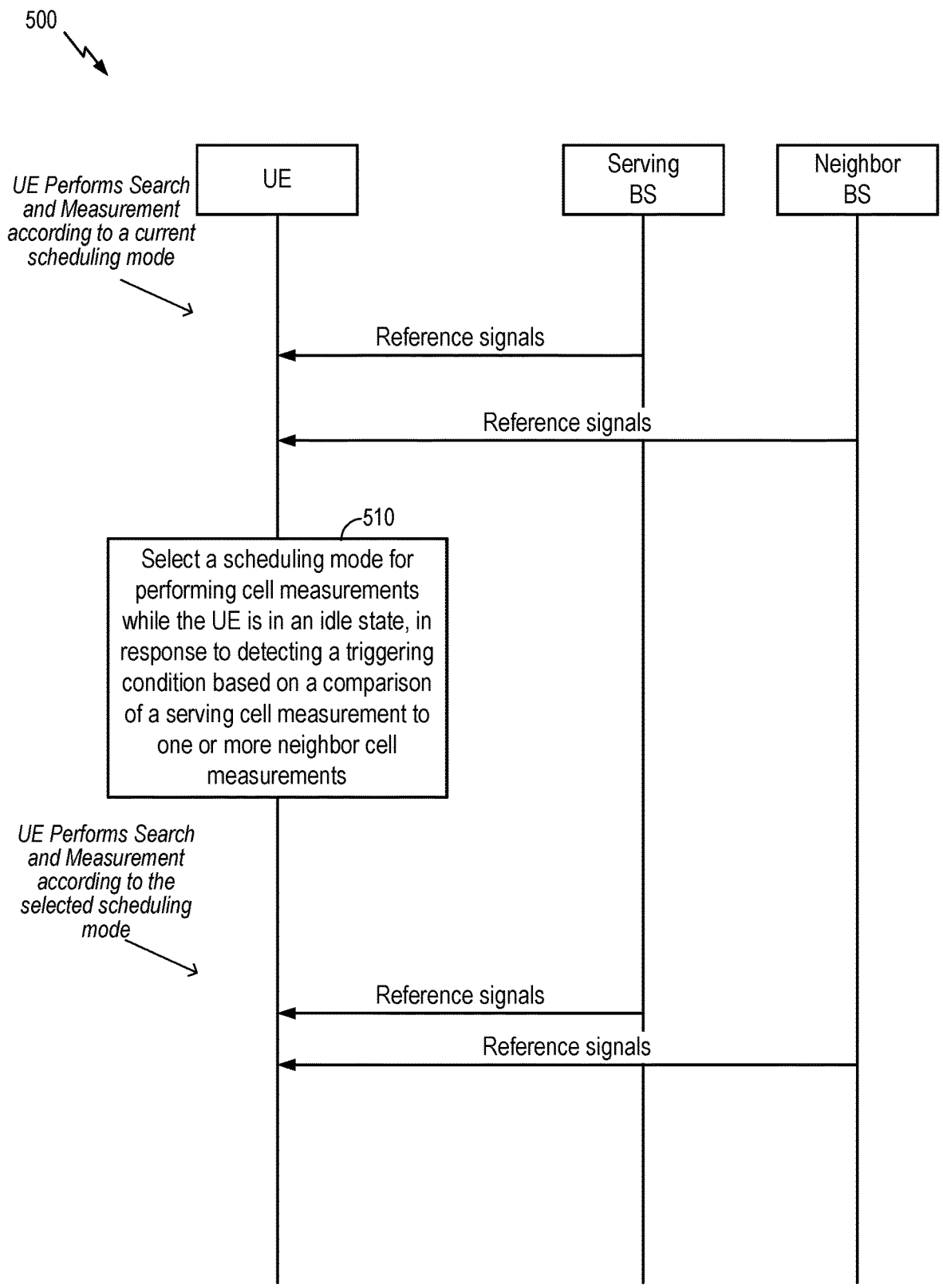
FIG. 5 depicts an example call flow diagram for cell measurement scheduling based on reference signal measurements, in accordance with aspects of the present disclosure.

For example, FIG. 5 depicts an example call flow diagram 500 for a UE configured to select a measurement scheduling mode based on a comparison of neighbor cell measurements to serving sell measurements.

As illustrated, the UE may initially measure reference signals from both the serving cell and a neighbor cell according to a first scheduling mode. The reference signals may be, for example, SSBs or any other suitable reference signal or combination of reference signals.

At 510, the UE selects a scheduling mode, in response to detecting a triggering condition based on a comparison of the serving cell measurement to one or more neighbor cell measurements. The UE then performs search and measurement according to the newly selected scheduling mode.

According to certain aspects, the UE may select the panic mode based on a difference between RSRP of a neighbor cell and the RSRP of the serving cell. In such cases, the triggering condition may be that the neighbor cell has an RSRP that is stronger than the RSRP of the serving cell by at least a threshold amount (e.g., 6 dB). The threshold amount could be predetermined.

Selecting a scheduling mode based on a comparison of serving cell and neighbor cell measurements may help in scenarios where neighboring cells use non-colliding synchronization signal block (SSB) cases. For example, different from LTE, NR base stations (gNBs) may configure multiple SSBs.

For a given UE in a certain location, the best SSB from the serving cell is not necessary the same as the best SSB from a neighbor cell (and, given the directionality of SSBs, usually it is not). Thus, if there is a neighbor cell that is much stronger than a serving cell, this may not necessarily be reflected in the serving cell SNR, measured on the serving SSB alone.

Accordingly, if relying only on serving cell measurements, a UE may not enter the panic mode based on the conventional SNR conditions. As a result, the UE may stay in a suboptimal coverage scenario longer (in a normal scheduling mode), than if it had transitioned to the panic mode sooner. By considering neighbor cell measurements, as depicted in FIG. 5, the UE may transition to panic mode sooner and select a more optimal neighbor cell more quickly.

In some cases, transition from the panic mode to normal mode and/or from the normal mode to the excellent mode may also consider both neighbor cell and serving cell measurements. In such cases, thresholds used to define transitions between scheduling modes may be selected accordingly (e.g., to transition from excellent mode, to normal mode, to panic mode, as signal quality in a serving cell decreases, at least relative to a neighbor cell).

In some cases, panic mode may be entered more quickly by detecting changes (drops) in signal quality based on comparison of serving cell measurements over time. In such cases, a panic mode triggering condition may be the detection of a significant drop in signal quality (e.g., in consecutive measurement periods) or a series of (consecutive) moderate drops.

Figure 6:
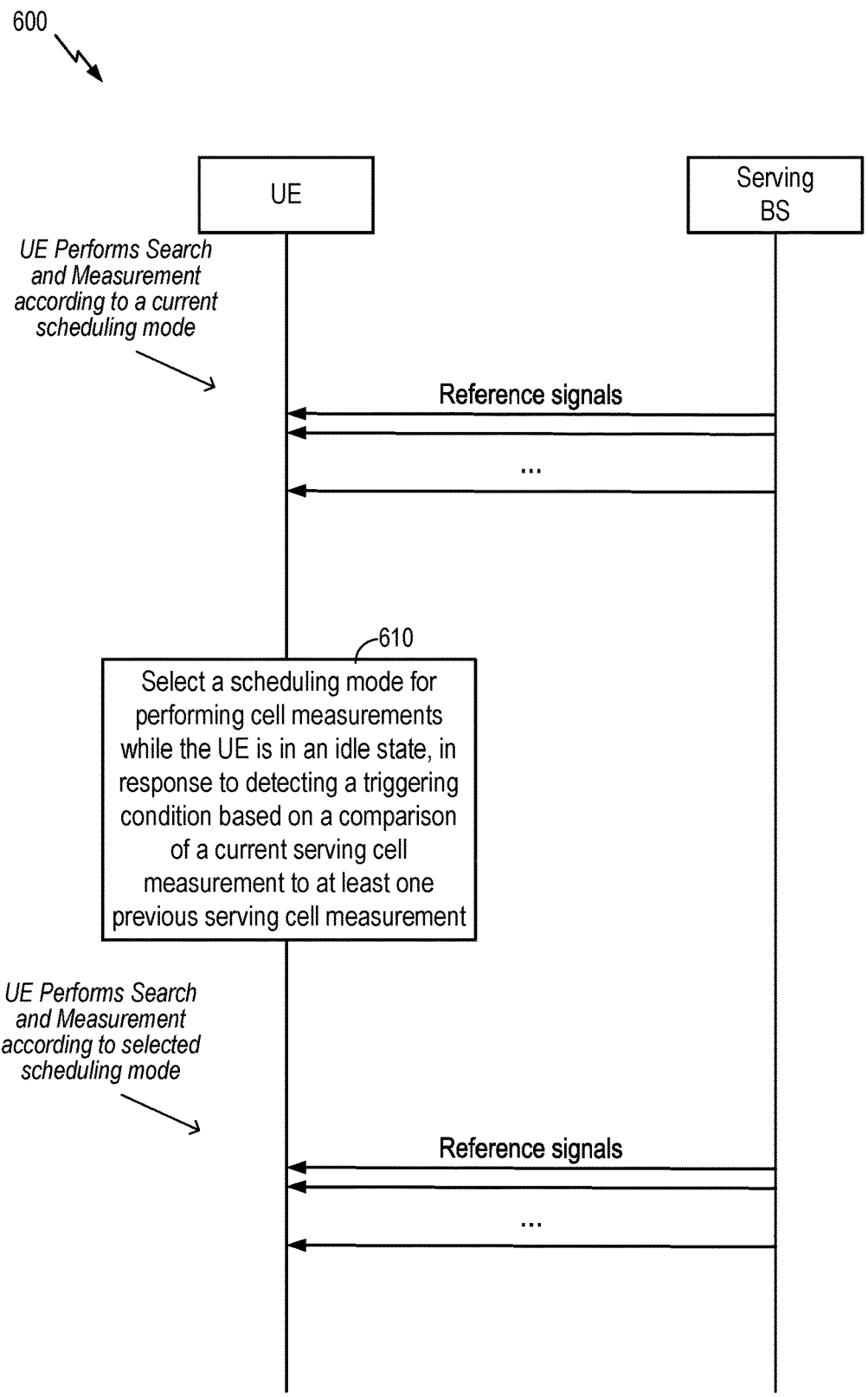
FIG. 6 depicts another example call flow diagram for cell measurement scheduling based on reference signal measurements, in accordance with aspects of the present disclosure.

FIG. 6 depicts an example call flow diagram 600 for a UE configured to select a measurement scheduling mode based on a comparison of serving cell measurements over time.

As illustrated, the UE may initially measure reference signals from the serving cell over time (e.g., over a number of measurement periods). At 610, the UE selects a scheduling mode, in response to detecting a triggering condition based on a comparison of a current serving cell measurement to one or more previous serving cell measurements. The UE then performs search and measurement according to the newly selected scheduling mode.

By comparing serving cell measurements over time in this manner, a UE may enter the panic mode based on serving RSRP dips. As noted above, the UE may trigger the panic mode after detecting a (single) significant drop in signal quality or (two or more) consecutive medium (less significant) drops in signal quality (unless SNR is still good despite the medium drops).

According to this approach, a UE may compute a change (delta) in RSRP (e.g., on the serving cell, serving cell SSB) based on measurements that are at least one DRX cycle apart. In some cases, the UE may determine to reset a reference RSRP used for computing the change if there is a serving cell change and/or a change to the serving cell SSBs. If the UE detects a delta in consecutive measurements that exceeds a threshold delta amount (e.g., RSRP delta<D_big dB, where a smaller negative number means a sharper drop) and the SNR is below a threshold (e.g., SNR<10 dB), the UE may trigger the panic mode. The check on the SNR may be used, for example, because a significant drop may be tolerated in previous signal quality is very high.

In some cases, if the panic mode is not triggered by a single big drop, the UE may then determine if there were one or more medium drops. According to certain aspects, if a UE detects a single medium drop (RSRP delta<D_med dB) while in excellent mode, the UE may decide to exit the excellent mode and transition to the normal mode, provided SNR is below a threshold (e.g., SNR<10 dB). If the UE detects multiple medium drops, the UE may trigger the panic mode (in some cases after transitioning from the excellent mode to the normal mode after detecting a first medium drop).

The various threshold changes in RSRP that constitute a big drop or a medium drop (e.g., D_big and D_med) for these purposes may be selected based on field and lab statistics, and may take different values based on the time interval between the measurements. In other words, larger threshold values (corresponding to sharper drops) may be used for longer time intervals between measurements.

As noted above, in some, when the signal quality is very good (e.g., SNR above a 10 dB threshold), a significant amount of drop in signal quality may be tolerated. Thus, in such cases, a UE may determine not to enter the panic mode, even after one big drop or two consecutive medium drops.

In some cases, a UE may suffer from rapid transitions (referred to as ping-ponging) between modes. For example, a UE may rapidly trigger and exit the panic mode, which may be suboptimal not allowing a UE sufficient time to take advantage of the more aggressive measurement scheduling.

According to certain aspects, in an effort to combat this scenario, time hysteresis may be introduced, by configuring a UE to remain in the panic mode for a minimum amount of time (e.g., several more DRX cycles) after entering the panic mode. In some cases, when the device determines to enter the panic mode, the device may enter the panic mode and set a counter for a predetermined number of DRX cycles (e.g., N_hys=4 cycles). As long as the device is operating in the panic mode, if any panic mode triggering condition is met (e.g., any of the triggering conditions described above with reference to FIG. 5 or 6), or remains met, then the UE may reset the counter (e.g., reset the counter to N_hys).

In some cases, the UE may be configured for early termination if conditions are very good. For example, if RSRP increases rapidly (e.g., an RSRP jump by +5 dB or SNR above 5 dB), the UE may exit the panic mode immediately (regardless of the counter value). Otherwise, if the device does not determine that conditions are sufficiently good, the UE may decrease the counter by 1 after each DRX cycle. If the counter reaches zero, the UE may exit the panic mode.

In some cases, one or more of the various approaches described herein may be combined. For example, a UE may be configured to select a scheduling mode based on a comparison of neighbor cell and serving cell measurements, based on a comparison of serving cell measurements over time (to detect drops), and/or apply time hysteresis when in the panic mode.

Figure 7:
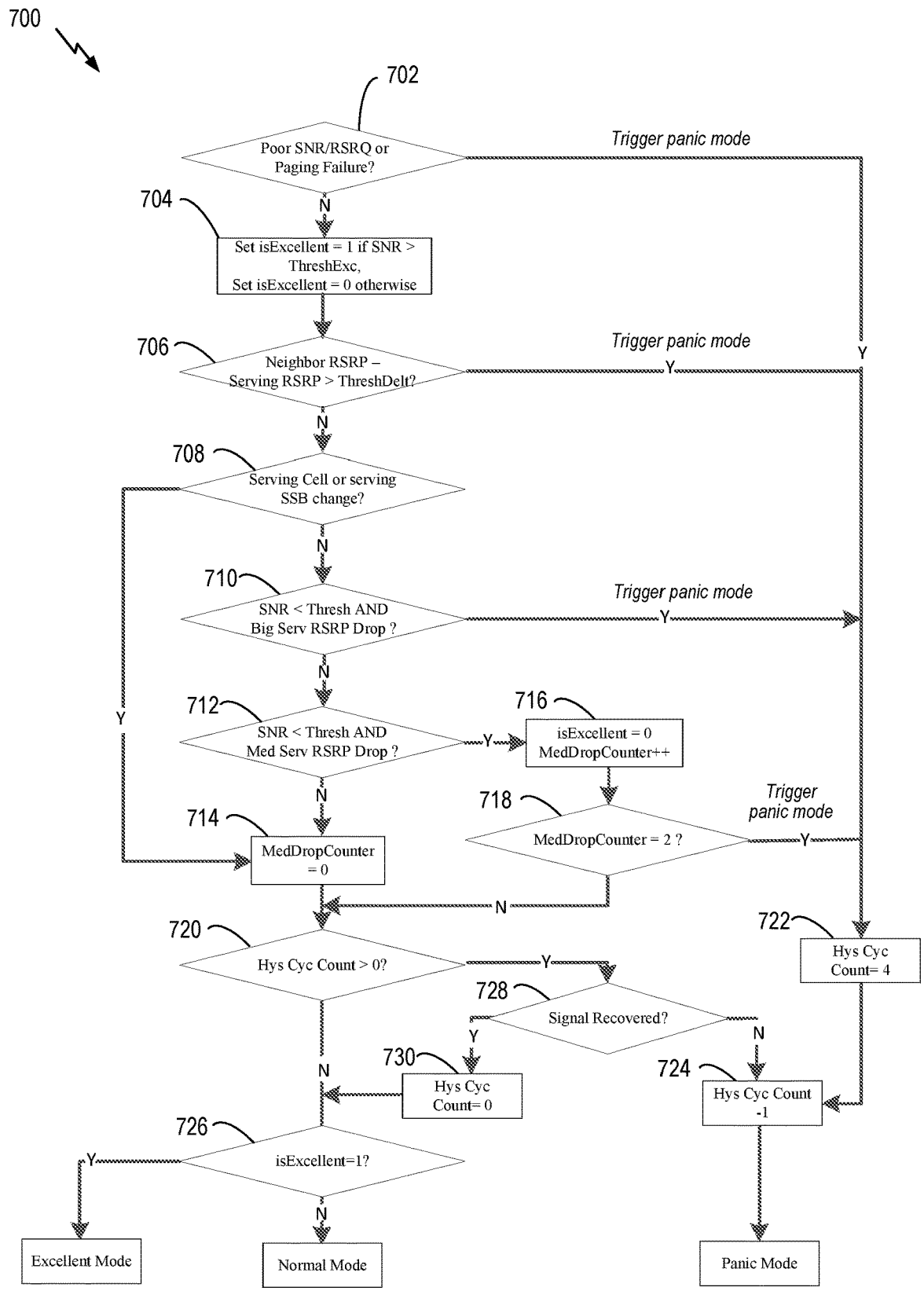
FIG. 7 depicts example operations for measurement scheduling based on reference signal measurements, in accordance with aspects of the present disclosure.

FIG. 7 depicts a flow diagram 700 for a UE to perform scheduling mode selection based on a combination of these approaches. In other words, the UE may trigger the panic mode based on any of the triggering conditions described above.

For example, if the UE determines at 702, that SNR or RSRQ is below a threshold value (e.g., SNR<-6 dB or RSRQ<-18 dB) or if paging failure(s) are detected, the UE may trigger the panic mode and set the hysteresis counter (Hys Cyc Count) at 722.

If none of the conditions are met, at 704, the UE may determine whether to enter the excellent mode (e.g., set a flag isExcellent=1 if the SNR is greater than 5 dB), or to stay in the normal mode (e.g., set a flag isExcellent=0 if the SNR is less than 5 dB).

At 706, the UE determines whether the RSRP of a neighbor cell is above a threshold value (e.g., at least 6 dB) greater than the RSRP of the serving cell. If so, the device may trigger the panic mode.

Otherwise, if the SNR of the serving cell or a serving SSB has changed, at 710 the UE may determine whether the serving cell SNR is below a threshold amount (e.g., less than 10 dB) and whether a large dip has occurred in the serving cell RSRP. If both conditions exist, the UE triggers the panic mode. Otherwise, at 712, the UE determines whether the serving cell SNR is below a threshold amount (e.g., less than 10 dB) and whether a medium drop has occurred in the RSRP. If not, a medium drop is not detected and, at 714, the UE may set a number of medium dips (e.g., cntMedDip) to 0.

If a medium drop is detected, at 716, the UE may exit the excellent mode (e.g., set a flag isExcellent equal to 0) and increment a counter for medium drops (e.g., MedDropCounter+1). At 718, if the UE determines two medium dips have occurred (e.g., whether counter cntMedDip=2), the UE triggers the panic mode.

As illustrated at 720, once the UE enters panic mode, it stays in the panic mode as long as the hysteresis counter (Hys Cyc Count set at 722) is not zero. As illustrated, the hysteresis timer may be reset, at 730, if the serving cell signal is recovered (e.g., meaning no panic trigger conditions are present) as determined at 728 and the UE may transition from the panic mode to the excellent mode or normal mode, as determined at 726. If the signal is not recovered, the hysteresis counter is decremented, at 724, and the UE stays in the panic mode. The operations may be repeated each measurement cycle.

While the example shown in FIG. 7 has the UE selecting a scheduling mode based on a comparison of neighbor cell and serving cell measurements, based on a comparison of serving cell measurements over time, and applying time hysteresis when in the panic mode, in some cases a UE may only implement one or more of these features. For example, a UE could be configured to select a scheduling mode based on a comparison of neighbor cell and serving cell measurements and apply time hysteresis when in the panic mode. As another example, a UE could be configured to select a scheduling mode based on a comparison of serving cell measurements over time and apply time hysteresis when in the panic mode. As still another example, a UE could be configured to select a scheduling mode based on a comparison of neighbor cell and serving cell measurements and also based on a comparison of serving cell measurements over time, while not applying time hysteresis.

In any case, aspects of the present disclosure may help optimize scheduling mode selection, increasing the likelihood the UE selects the panic mode only when it is more likely the increased cell measurement frequency will lead to selection of a neighbor. The techniques may result in improvements in cell reselection delay in various applications, particularly those involving high mobility, such as high speed train (HST) scenarios. Actual projected gains may be estimated based on HST field logs, for example, by plotting a delta cumulative distribution function (CDF) for improvements in idle mode cell reselection time using the techniques proposed herein.

The techniques presented herein may help address likely scenarios, such as expected RSRP drops in practice. For example, RSRP thresholds used for triggering panic mode based on drops could be determined based on an RSRP slope distribution observed in the field. Such a distribution could yield statistics on how much RSRP typically dips in field. In some cases, such a log may be obtained by extract RSRP measurements from connected mode logs. In some cases, the results could be filtered to remove the measurement errors and slopes could be computed based on samples around 1 see away to plot a cumulative distribution function (CDF). For non-mobility logs, the slope may be mostly (90% of the time) within 2 dB/sec. For mobility logs, the slope may be within +/−2 dB/see some amount of the time (e.g., 70% of the time) or more (e.g., 90% of the time) within +/−5 dB/sec.

EXAMPLE METHODS

Figure 8:
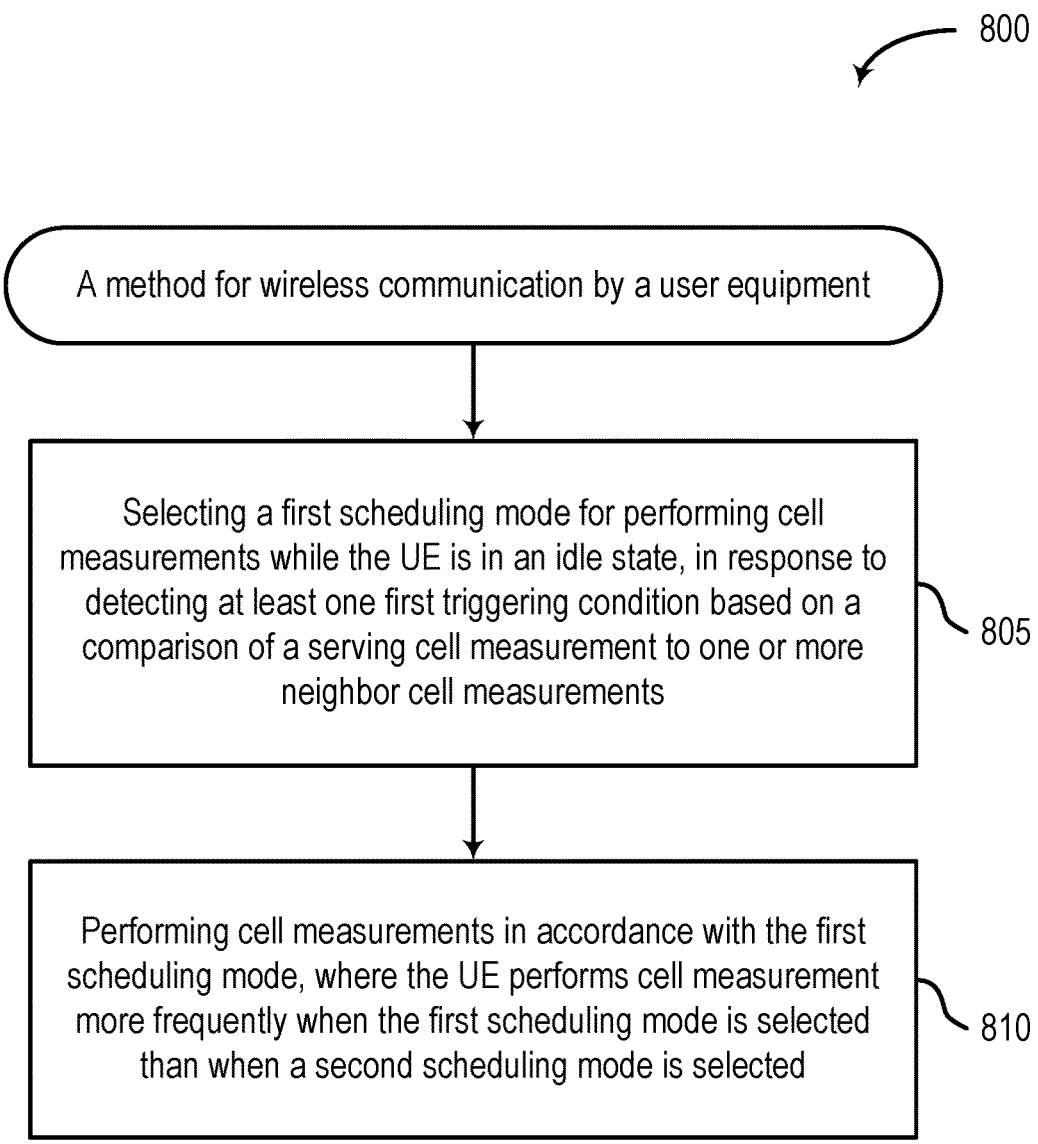
FIGS. 8 and 9 depict example processes of wireless communication according to aspects of the present disclosure.

FIG. 8 shows an example of a method 800 for wireless communication according to aspects of the present disclosure. In some aspects, a user equipment, such as UE 104 of FIGS. 1 and 2, or processing system 1005 of FIG. 10, may perform the method 800.

Method 800 begins at step 805 with selecting a first scheduling mode for performing cell measurements while the UE is in an idle state, in response to detecting at least one first triggering condition based on a comparison of a serving cell measurement to one or more neighbor cell measurements. In some cases, the operations of this step refer to, or may be performed by, measurement scheduling mode selection circuitry as described with reference to FIG. 10.

Method 800 then proceeds to step 810 with performing cell measurements in accordance with the first scheduling mode, wherein the UE performs cell measurement more frequently when the first scheduling mode is selected than when a second scheduling mode is selected. In some cases, the operations of this step refer to, or may be performed by, cell measurement circuitry as described with reference to FIG. 10.

In some aspects, the at least one triggering condition comprises at least one neighbor cell measurement exceeding the serving cell measurement by a first threshold value. In some aspects, the at least one neighbor cell measurement and the serving cell measurement comprise RSRP measurements.

In some aspects, method 800 includes selecting the first scheduling mode when a second triggering condition is met comprising at least one of: a current serving cell measurement being less than a previous serving cell measurement by a second threshold amount or at least two consecutive serving cell measurements dropping by at least a third threshold amount relative to a previous serving cell measurement; or the current serving cell measurement being below a fourth threshold.

In some aspects, method 800 further includes transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected.

In some aspects, at least one of the second threshold or third threshold depends on a time interval between serving cell measurements.

In some aspects, the method 800 further includes setting a counter to the number of measurement cycles upon selecting the first scheduling mode. In some aspects, the method 800 further includes resetting the counter to the number of measurement cycles if any of the first or other triggering conditions are met. In some aspects, the method 800 further includes decrementing the counter each measurement cycle. In some aspects, the method 800 further includes exiting the first scheduling mode if the counter reaches zero. In some aspects, the method 800 further includes exiting the first scheduling mode before the counter reaches zero if a second trigger condition indicating improved serving cell measurement is met.

Figure 9:
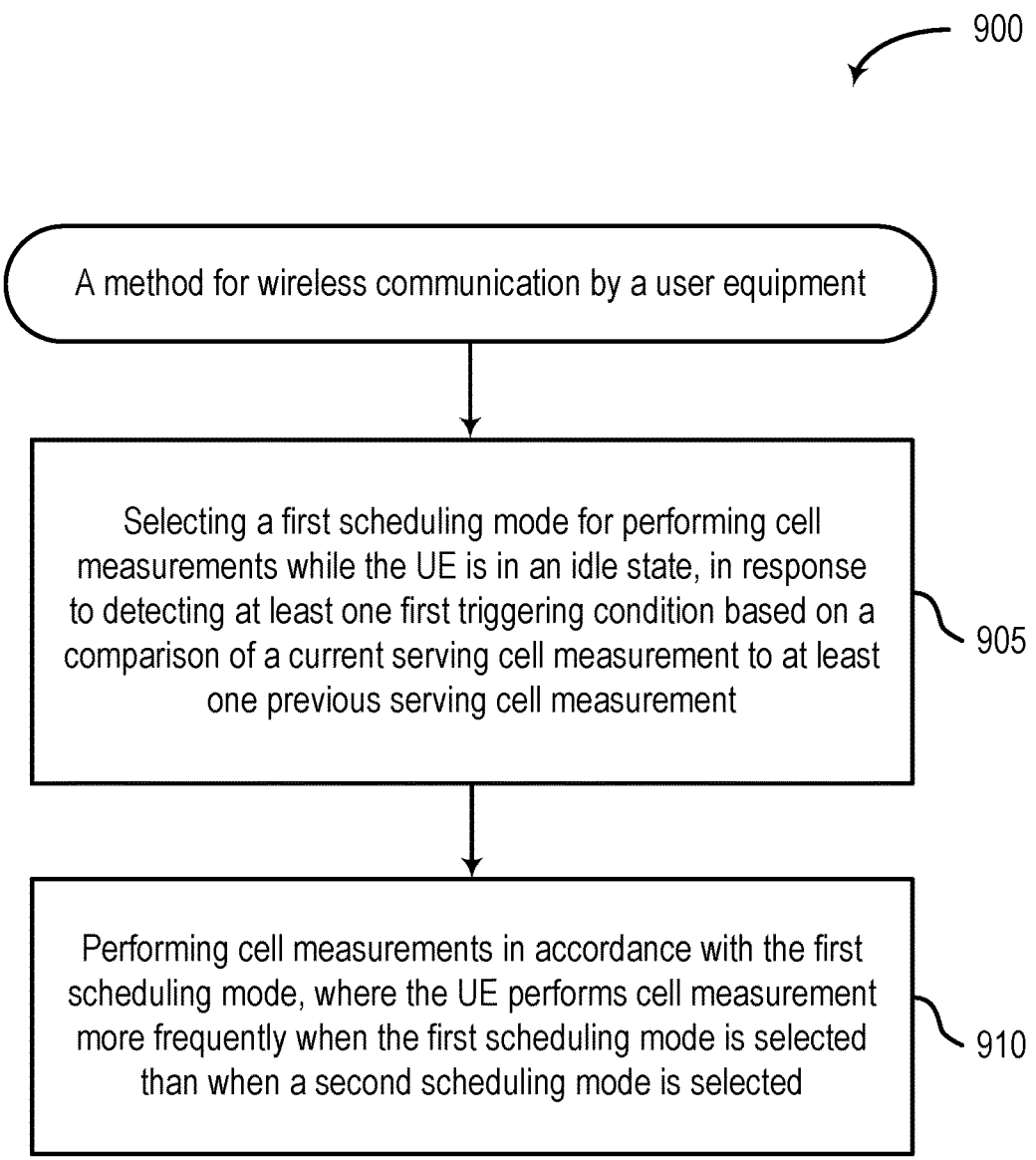

FIG. 9 shows an example of a method 900 for wireless communication according to aspects of the present disclosure. In some aspects, a base station, such as BS 102 of FIGS. 1 and 2, or processing system 1005 of FIG. 10, may perform the method 900.

Method 900 begins at step 905 with selecting a first scheduling mode for performing cell measurements while the UE is in an idle state, in response to detecting at least one first triggering condition based on a comparison of a current serving cell measurement to at least one previous serving cell measurement. In some cases, the operations of this step refer to, or may be performed by, measurement scheduling mode selection circuitry as described with reference to FIG. 10.

Method 900 then proceeds to step 910 with performing cell measurements in accordance with the first scheduling mode, wherein the UE performs cell measurement more frequently when the first scheduling mode is selected than when a second scheduling mode is selected. In some cases, the operations of this step refer to, or may be performed by, cell measurement circuitry as described with reference to FIG. 10.

In some aspects, the current serving cell measurement and at least one previous serving cell measurement comprise RSRP measurements.

In some aspects, the at least one triggering condition comprises: a current serving cell measurement being less than a previous serving cell measurement by a second threshold amount or at least two consecutive serving cell measurements dropping by at least a third threshold amount relative to a previous serving cell measurement; and the current serving cell measurement being below a fourth threshold. In some aspects, the method 900 further includes transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected. In some aspects, at least one of the second threshold or third threshold depends on a time interval between serving cell measurements.

In some aspects, the method 900 further includes setting a counter to the number of measurement cycles upon selecting the first scheduling mode. In some aspects, the method 900 further includes resetting the counter to the number of measurement cycles if any of the first or other triggering conditions are met. In some aspects, the method 900 further includes decrementing the counter each measurement cycle. In some aspects, the method 900 further includes exiting the first scheduling mode if the counter reaches zero. In some aspects, the method 900 further includes exiting the first scheduling mode before the counter reaches zero if a second trigger condition indicating improved serving cell measurement is met.

Example Wireless Communication Device

Figure 10:
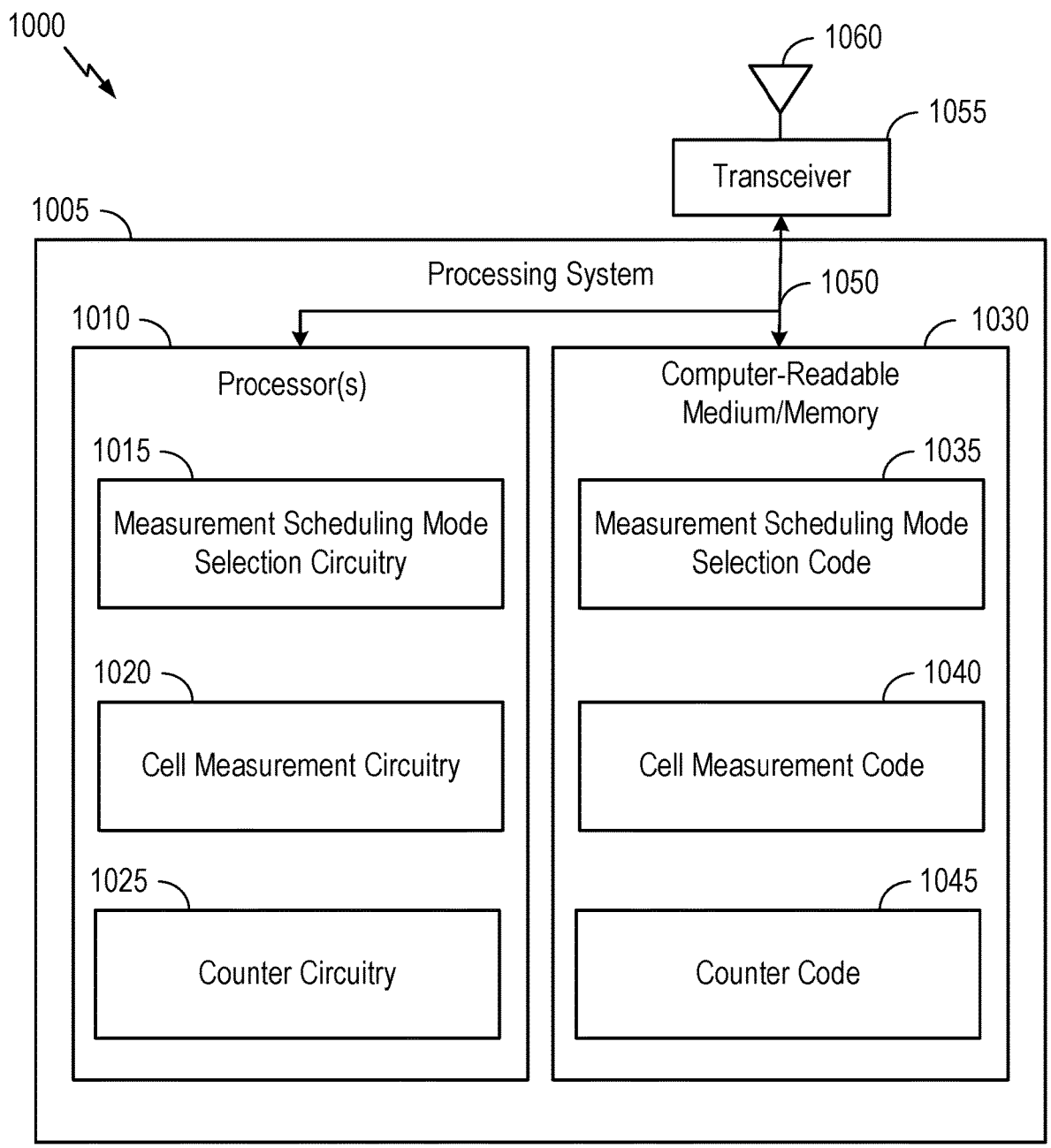
FIG. 10 depicts an example communication device according to aspects of the present disclosure.

FIG. 10 depicts an example communications device 1000 that includes various components operable, configured, or adapted to perform operations for the techniques disclosed herein, such as the operations depicted and described with respect to FIGS. 5-9. In some examples, communication device 1000 may be a UE 104 as described, for example with respect to FIGS. 1 and 2.

Communications device 1000 includes a processing system 1005 coupled to the transceiver 1055 (e.g., a transmitter and/or a receiver). The transceiver 1055 is configured to transmit (or send) and receive signals for the communications device 1000 via the antenna 1060, such as the various signals as described herein. The transceiver 1055 may communicate bi-directionally, via the antennas 1060, wired links, or wireless links as described herein. For example, the transceiver 1055 may represent a wireless transceiver and may communicate bi-directionally with another wireless transceiver. The transceiver 1055 may also include or be connected to a modem to modulate the packets and provide the modulated packets to for transmission, and to demodulate received packets. In some examples, the transceiver 1055 may be tuned to operate at specified frequencies. For example, a modem can configure the transceiver 1055 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1030 via a bus 1050.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1030 is configured to store instructions (e.g., computer-executable code) that when executed by the one or more processors 1010, cause the one or more processors 1010 to perform the operations illustrated in FIGS. 5-9, or other operations for performing the various techniques discussed herein.

In one aspect, computer-readable medium/memory 1030 includes measurement scheduling mode selection code 1035, cell measurement code 1040, and counter code 1045.

Examples of a computer-readable medium/memory 1030 include random access memory (RAM), read-only memory (ROM), solid state memory, a hard drive, a hard disk drive, etc. In some examples, computer-readable medium/memory 1030 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1000 may provide means for performing the methods described herein, including with respect to FIGS. 5-9.

In some examples, means for transmitting or sending (or means for outputting for transmission) may include transceivers 254 and/or antenna(s) 252 of the UE 104 illustrated in FIG. 2 and/or the transceiver 1055 and the antenna 1060 of the communication device in FIG. 10.

In some examples, means for receiving (or means for obtaining) may include transceivers 254 and/or antenna(s) 252 of the UE 104 illustrated in FIG. 2 and/or the transceiver 1055 and the antenna 1060 of the communication device in FIG. 10.

In some examples, means for various operations described herein may include various processing system 1005 components, such as: the one or more processors 1010 in FIG. 10, or aspects of the UE 104 depicted in FIG. 2, including receive processor 258, transmit processor 264, TX MIMO processor 266, and/or controller/processor 280 (including measurement scheduling mode selection component 281).

In one aspect, one or more processors 1010 includes measurement scheduling mode selection circuitry 1015, cell measurement circuitry 1020, and counter circuitry 1025.

According to some aspects, measurement scheduling mode selection circuitry 1015 selects a first scheduling mode for performing cell measurements while the UE is in an idle state, in response to detecting at least one first triggering condition based on a comparison of a serving cell measurement to one or more neighbor cell measurements.

According to some aspects, cell measurement circuitry 1020 performs cell measurements in accordance with the first scheduling mode, wherein the UE performs cell measurement more frequently when the first scheduling mode is selected than when a second scheduling mode is selected.

In some aspects, the at least one triggering condition comprises at least one neighbor cell measurement exceeding the serving cell measurement by a first threshold value. In some aspects, the at least one neighbor cell measurement and the serving cell measurement comprise RSRP measurements.

In some examples, measurement scheduling mode selection circuitry 1015 selects the first scheduling mode when a second triggering condition is met comprising at least one of: a current serving cell measurement being less than a previous serving cell measurement by a second threshold amount or at least two consecutive serving cell measurements dropping by at least a third threshold amount relative to a previous serving cell measurement; or the current serving cell measurement being below a fourth threshold. In some examples, measurement scheduling mode selection circuitry 1015 transitions from a third scheduling mode when one serving cell measurement drops by at least the second threshold amount relative to the previous serving cell measurement, wherein the UE performs cell measurement more frequently when the second scheduling mode is selected than when the third scheduling mode is selected. In some aspects, at least one of the second threshold or third threshold depends on a time interval between serving cell measurements.

According to some aspects, counter circuitry 1025 sets a counter to the number of measurement cycles upon selecting the first scheduling mode. In some examples, counter circuitry 1025 resets the counter to the number of measurement cycles if any of the first or other triggering conditions are met. In some examples, counter circuitry 1025 decrements the counter each measurement cycle. In some examples, measurement scheduling mode selection circuitry 1015 exits the first scheduling mode if the counter reaches zero. In some examples, measurement scheduling mode selection circuitry 1015 exits the first scheduling mode before the counter reaches zero if a second trigger condition indicating improved serving cell measurement is met.

According to some aspects, measurement scheduling mode selection circuitry 1015 selects a first scheduling mode for performing cell measurements while the UE is in an idle state, in response to detecting at least one first triggering condition based on a comparison of a current serving cell measurement to at least one previous serving cell measurement. In some examples, cell measurement circuitry 1020 performs cell measurements in accordance with the first scheduling mode, wherein the UE performs cell measurement more frequently when the first scheduling mode is selected than when a second scheduling mode is selected.

In some aspects, the current serving cell measurement and at least one previous serving cell measurement comprise RSRP measurements. In some aspects, the at least one triggering condition comprises: a current serving cell measurement being less than a previous serving cell measurement by a second threshold amount or at least two consecutive serving cell measurements dropping by at least a third threshold amount relative to a previous serving cell measurement; and the current serving cell measurement being below a fourth threshold.

Notably, FIG. 10 is just one example, and many other examples and configurations of communication device are possible.

Example Clauses

Implementation examples are described in the following numbered clauses:

Clause 1: A method for wireless communication by a user equipment, the method comprising: selecting a first scheduling mode for performing cell measurements while the UE is in an idle state, in response to detecting at least one first triggering condition based on a comparison of a serving cell measurement to one or more neighbor cell measurements; and performing cell measurements in accordance with the first scheduling mode, wherein the UE performs cell measurement more frequently when the first scheduling mode is selected than when a second scheduling mode is selected.

Clause 2: The method of Clause 1, wherein the at least one first triggering condition comprises at least one neighbor cell measurement exceeding the serving cell measurement by a first threshold value.

Clause 3: The method of Clause 2, wherein the at least one neighbor cell measurement and the serving cell measurement comprise RSRP measurements.

Clause 4: The method of any one of Clauses 1-3, further comprises selecting the first scheduling mode when a second triggering condition is met comprising at least one of: a current serving cell measurement being less than a previous serving cell measurement by a second threshold amount or at least two consecutive serving cell measurements dropping by at least a third threshold amount relative to a previous serving cell measurement; or the current serving cell measurement being below a fourth threshold.

Clause 5: The method of Clause 4, further comprising: transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected.

Clause 6: The method of Clause 4, wherein at least one of the second threshold amount or the third threshold amount depends on a time interval between serving cell measurements.

Clause 7: The method of any one of Clauses 1-6, further comprising: setting a counter to a number of measurement cycles upon selecting the first scheduling mode; resetting the counter to the number of measurement cycles if any of the first or other triggering conditions are met; decrementing the counter each measurement cycle; and exiting the first scheduling mode if the counter reaches zero.

Clause 8: The method of Clause 7, further comprising: exiting the first scheduling mode before the counter reaches zero if a second trigger condition indicating improved serving cell measurement is met.

Clause 9: A method for wireless communication by a user equipment, the method comprising: selecting a first scheduling mode for performing cell measurements while the UE is in an idle state, in response to detecting at least one first triggering condition based on a comparison of a current serving cell measurement to at least one previous serving cell measurement; and performing cell measurements in accordance with the first scheduling mode, wherein the UE performs cell measurement more frequently when the first scheduling mode is selected than when a second scheduling mode is selected.

Clause 10: The method of Clause 9, wherein the current serving cell measurement and at the least one previous serving cell measurement comprise RSRP measurements.

Clause 11: The method of any one of Clauses 9 and 10, wherein the at least one triggering condition comprises: the current serving cell measurement being less than a previous serving cell measurement of the at least one previous serving cell measurement by a second threshold amount or at least two consecutive serving cell measurements dropping by at least a third threshold amount relative to a previous serving cell measurement of the at least one previous serving cell measurement; and the current serving cell measurement being below a fourth threshold.

Clause 12: The method of Clause 11, further comprising: transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected.

Clause 13: The method of Clause 11, wherein at least one of the second threshold amount or the third threshold amount depends on a time interval between serving cell measurements.

Clause 14: The method of any one of Clauses 9-13, further comprising: setting a counter to a number of measurement cycles upon selecting the first scheduling mode; resetting the counter to the number of measurement cycles if any of the first or other triggering conditions are met; decrementing the counter each measurement cycle; and exiting the first scheduling mode if the counter reaches zero.

Clause 15: The method of Clause 14, further comprising: exiting the first scheduling mode before the counter reaches zero if a second trigger condition indicating improved serving cell measurement is met.

Clause 16: A processing system, comprising: a memory comprising computer-executable instructions; one or more processors configured to execute the computer-executable instructions and cause the processing system to perform a method in accordance with any one of Clauses 1-15.

Clause 17: A processing system, comprising means for performing a method in accordance with any one of Clauses 1-15.

Clause 18: A non-transitory computer-readable medium comprising computer-executable instructions that, when executed by one or more processors of a processing system, cause the processing system to perform a method in accordance with any one of Clauses 1-15.

Clause 19: A computer program product embodied on a computer-readable storage medium comprising code for performing a method in accordance with any one of Clauses 1-15.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mm Wave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of idle mode measurement scheduling mode selection in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
   selecting a first scheduling mode for performing cell measurements while the UE is in an idle state, in response to detecting at least one first triggering condition based on a comparison of a serving cell measurement to one or more neighbor cell measurements;
   performing cell measurements in accordance with the first scheduling mode, wherein the UE performs cell measurement more frequently when the first scheduling mode is selected than when a second scheduling mode is selected;
   setting a counter to a number of measurement cycles upon selecting the first scheduling mode;
   resetting the counter to the number of measurement cycles if any of the first triggering condition or one or more other triggering conditions are met;
   decrementing the counter each measurement cycle; and
   exiting the first scheduling mode if the counter reaches zero.

2. The method of claim 1, wherein the at least one first triggering condition comprises at least one neighbor cell measurement exceeding the serving cell measurement by a first threshold value.

3. The method of claim 2, wherein the at least one neighbor cell measurement and the serving cell measurement comprise reference signal received power (RSRP) measurements.

4. The method of claim 1, further comprises selecting the first scheduling mode when a second triggering condition is met comprising at least one of:
   a current serving cell measurement being less than a previous serving cell measurement by a second threshold amount or at least two consecutive serving cell measurements dropping by at least a third threshold amount relative to a previous serving cell measurement; or
   the current serving cell measurement being below a fourth threshold.

5. The method of claim 4, further comprising transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected.

6. The method of claim 4, wherein at least one of the second threshold amount or the third threshold amount depends on a time interval between serving cell measurements.

7. The method of claim 1, further comprising exiting the first scheduling mode before the counter reaches zero if a second trigger condition indicating improved serving cell measurement is met.

8. A method for wireless communications by a user equipment (UE), comprising:
selecting a first scheduling mode for performing cell measurements while the UE is in an idle state, in response to detecting at least one first triggering condition based on a comparison of a current serving cell measurement to at least one previous serving cell measurement;
performing cell measurements in accordance with the first scheduling mode, wherein the UE performs cell measurement more frequently when the first scheduling mode is selected than when a second scheduling mode is selected;
setting a counter to a number of measurement cycles upon selecting the first scheduling mode;
resetting the counter to the number of measurement cycles if any of the first triggering condition or one or more other triggering conditions are met;
decrementing the counter each measurement cycle; and
exiting the first scheduling mode if the counter reaches zero.

9. The method of claim 8, wherein the current serving cell measurement and the at least one previous serving cell measurement comprise reference signal received power (RSRP) measurements.

10. The method of claim 8, wherein the at least one first triggering condition comprises:
the current serving cell measurement being less than a previous serving cell measurement of the at least one previous serving cell measurement by a second threshold amount or at least two consecutive serving cell measurements dropping by at least a third threshold amount relative to a previous serving cell measurement of the at least one previous serving cell measurement; and
the current serving cell measurement being below a fourth threshold.

11. The method of claim 10, further comprising:
transitioning from a third scheduling mode when one serving cell measurement drops by at least the second threshold amount relative to the previous serving cell measurement, wherein the UE performs cell measurement more frequently when the second scheduling mode is selected than when the third scheduling mode is selected.

12. The method of claim 10, wherein at least one of the second threshold amount or the third threshold amount depends on a time interval between serving cell measurements.

13. The method of claim 8, further comprising:
exiting the first scheduling mode before the counter reaches zero if a second trigger condition indicating improved serving cell measurement is met.

14. A user equipment (UE) configured for wireless communication, comprising: a memory comprising computer-executable instructions; and one or more processors configured to execute the computer-executable instructions and cause the UE to:
select a first scheduling mode for performing cell measurements while the UE is in an idle state, in response to detecting at least one first triggering condition based on a comparison of a serving cell measurement to one or more neighbor cell measurements;
perform cell measurements in accordance with the first scheduling mode, wherein the UE performs cell measurement more frequently when the first scheduling mode is selected than when a second scheduling mode is selected;
set a counter to a number of measurement cycles upon selecting the first scheduling mode;
reset the counter to the number of measurement cycles if any of the first triggering condition or one or more other triggering conditions are met;
decrement the counter each measurement cycle; and
exit the first scheduling mode if the counter reaches zero.

15. The UE of claim 14, wherein the at least one first triggering condition comprises at least one neighbor cell measurement exceeding the serving cell measurement by a first threshold value.

16. The UE of claim 15, wherein the at least one neighbor cell measurement and the serving cell measurement comprise reference signal received power (RSRP) measurements.

17. The UE of claim 14, wherein the one or more processors are configured to execute the computer-executable instructions and cause the UE to select the first scheduling mode when a second triggering condition is met comprising at least one of:
a current serving cell measurement being less than a previous serving cell measurement by a second threshold amount or at least two consecutive serving cell measurements dropping by at least a third threshold amount relative to a previous serving cell measurement; or
the current serving cell measurement being below a fourth threshold.

18. The UE of claim 17, wherein the one or more processors are configured to execute the computer-executable instructions and further cause the UE to:
transition from a third scheduling mode when one serving cell measurement drops by at least the second threshold amount relative to the previous serving cell measurement, wherein the UE performs cell measurement more frequently when the second scheduling mode is selected than when the third scheduling mode is selected.

19. The UE of claim 17, wherein at least one of the second threshold amount or the third threshold amount depends on a time interval between serving cell measurements.

20. The UE of claim 14, wherein the one or more processors are configured to execute the computer-executable instructions and further cause the UE to:
exit the first scheduling mode before the counter reaches zero if a second trigger condition indicating improved serving cell measurement is met.

21. A user equipment (UE) configured for wireless communication, comprising: a memory comprising computer-executable instructions; and one or more processors configured to execute the computer-executable instructions and cause the UE to:

select a first scheduling mode for performing cell measurements while the UE is in an idle state, in response to detecting at least one first triggering condition based on a comparison of a current serving cell measurement to at least one previous serving cell measurement;
perform cell measurements in accordance with the first scheduling mode, wherein the UE performs cell measurement more frequently when the first scheduling mode is selected than when a second scheduling mode is selected;
set a counter to a number of measurement cycles upon selecting the first scheduling mode;
reset the counter to the number of measurement cycles if any of the first triggering condition or one or more other triggering conditions are met;
decrement the counter each measurement cycle; and
exit the first scheduling mode if the counter reaches zero.

22. The UE of claim 21, wherein the current serving cell measurement and the at least one previous serving cell measurement comprise reference signal received power (RSRP) measurements.

23. The UE of claim 21, wherein the at least one first triggering condition comprises:
the current serving cell measurement being less than a previous serving cell measurement of the at least one previous serving cell measurement by a second threshold amount or at least two consecutive serving cell measurements dropping by at least a third threshold amount relative to a previous serving cell measurement of the at least one previous serving cell measurement; and
the current serving cell measurement being below a fourth threshold.

24. The UE of claim 23, wherein the one or more processors are configured to execute the computer-executable instructions and further cause the UE to:
transition from a third scheduling mode when one serving cell measurement drops by at least the second threshold amount relative to the previous serving cell measurement, wherein the UE performs cell measurement more frequently when the second scheduling mode is selected than when the third scheduling mode is selected.

25. The UE of claim 23, wherein at least one of the second threshold amount or the third threshold amount depends on a time interval between serving cell measurements.

26. The UE of claim 21, wherein the one or more processors are configured to execute the computer-executable instructions and further cause the UE to:
exit the first scheduling mode before the counter reaches zero if a second trigger condition indicating improved serving cell measurement is met.

* * * * *